(12) United States Patent
Coster et al.

(10) Patent No.: US 7,504,350 B2
(45) Date of Patent: *Mar. 17, 2009

(54) COLOURED SODA-LIME GLASS

(75) Inventors: Dominique Coster, Jumet (BE); Laurent Delmotte, Jumet (BE); Marc Van Den Neste, Jumet (BE)

(73) Assignee: AGC Flat Glass Europe SA, Brussels (BE)

( * ) Notice: Subject to any disclaimer, the term of this patent is extended or adjusted under 35 U.S.C. 154(b) by 112 days.

This patent is subject to a terminal disclaimer.

(21) Appl. No.: 10/498,671

(22) PCT Filed: Dec. 5, 2002

(86) PCT No.: PCT/EP02/13965

§ 371 (c)(1),
(2), (4) Date: Jun. 14, 2004

(87) PCT Pub. No.: WO03/051786

PCT Pub. Date: Jun. 26, 2003

(65) Prior Publication Data

US 2005/0148453 A1  Jul. 7, 2005

(30) Foreign Application Priority Data

Dec. 14, 2001  (BE)  ................................. 2001/0817
Jul. 18, 2002  (BE)  ................................. 2002/0445

(51) Int. Cl.
*C03C 3/087* (2006.01)
(52) U.S. Cl. .......................................... 501/70; 501/71
(58) Field of Classification Search ................... 501/70, 501/71
See application file for complete search history.

(56) References Cited

U.S. PATENT DOCUMENTS

| | | | | |
|---|---|---|---|---|
| 5,688,727 A * | 11/1997 | Shelestak et al. | ............. | 501/71 |
| 5,830,814 A | 11/1998 | Combes | | |
| 5,837,629 A * | 11/1998 | Combes et al. | ............... | 501/70 |
| 5,897,956 A | 4/1999 | Kijima et al. | | |
| 6,335,299 B1 | 1/2002 | Foguenne et al. | | |
| 6,416,890 B1 | 7/2002 | Terneu et al. | | |
| 6,589,897 B1 | 7/2003 | Foguenne | | |
| 6,800,575 B1 | 10/2004 | Coster et al. | | |
| 7,094,716 B2 * | 8/2006 | Boulos et al. | .................. | 501/70 |
| 7,151,065 B2 * | 12/2006 | Thomsen et al. | ............... | 501/71 |
| 2002/0198094 A1 * | 12/2002 | Arbab et al. | ................... | 501/64 |
| 2004/0014587 A1 * | 1/2004 | Shelestak et al. | ............... | 501/70 |

FOREIGN PATENT DOCUMENTS

| | | | |
|---|---|---|---|
| EP | 0745566 | | 12/1996 |
| EP | 0811581 | | 12/1997 |
| EP | 816296 A1 * | | 1/1998 |
| EP | 1013620 | | 6/2000 |
| WO | WO99/05069 | | 2/1999 |
| WO | WO 99/58462 A * | | 11/1999 |
| WO | WO01/74729 | | 10/2001 |
| WO | WO01/98221 | | 12/2001 |

\* cited by examiner

*Primary Examiner*—David M Brunsman
(74) *Attorney, Agent, or Firm*—Akerman Senterfitt

(57) ABSTRACT

The present invention relates to a colored soda-lime glass which comprises iron in a quantity which, expressed in weight of the oxide $Fe_2O_3$ in relation to the total weight of glass, is greater than or equal to 0.5%, and less than or equal to 1.0% (quantity of total iron), a ratio of $Fe^{2+}$/total Fe (redox ratio) in the range of between 20 and 65%, cerium in a quantity which, expressed in weight of $CeO_2$ in relation to the total weight of glass, is greater than or equal to 0.1%, and titanium in a quantity which, expressed in weight of $TiO_2$ in relation to the total weight of glass, is greater than or equal to 0% and less than 0.2%. This glass has a light transmission (TLA4) in the range of between 15 and 55%, a total transmission in the ultraviolet (TUV4) of less than or equal to 30%, and a dominant wavelength in transmission ($\lambda D$) of less than or equal to 491 nm. This glass can be used, for example, as side glazing, rear-view window, roof glazing or opening roof of a motor vehicle.

19 Claims, No Drawings

COLOURED SODA-LIME GLASS

CROSS-REFERENCE TO RELATED APPLICATIONS

This application is the entry into the U.S. National Stage of PCT Application No. PCT/EP02/13965 filed 5 Dec. 2002, and claims priority from Belgian Application No. 2001/0817 filed 14 Dec. 2001 and Belgian Application No. 2002/0445 filed 18 Jul. 2002, the disclosures of all of which are hereby incorporated by reference.

BACKGROUND OF THE INVENTION

The present invention relates to a coloured soda-lime.

Soda-lime glass can be clear or coloured, for example, green, grey or blue in transmission.

The expression "soda-lime glass" is used here in the wide sense and relates to any glass which is likely to contain the following principal glass-forming constituents (in percentages by weight):

| | |
|---|---|
| $SiO_2$ | 60 to 75% |
| $Na_2O$ | 10 to 20% |
| CaO | 0 to 16% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20%. |
| $B_2O_3$ | 0 to 5% |

In some cases, soda-lime glass can have a total percentage by weight of BaO, CaO and MgO greater than 10%, and even greater than 12%.

This type of glass is very widely used in the field of glazing for automobiles or buildings, for example. It is usually manufactured in the form of a ribbon by the float process. Such a ribbon can be cut into sheets which can then be bent or can undergo treatment to improve their mechanical properties, e.g. a thermal toughening step.

It is generally necessary to relate the optical properties of a glass sheet to a standard illuminant. In the present description, two standard illuminants are used: illuminant C and illuminant A defined by the Commission Internationale de l'Eclairage (C.I.E.). Illuminant C represents average daylight having a colour temperature of 6700 K. This illuminant is especially useful for evaluating the optical properties of glazing intended for buildings. Illuminant A represents the radiation of a Planck radiator with a temperature of about 2856 K. This illuminant describes the light emitted by car headlights and is essentially intended to evaluate the optical properties of glazings intended for automobiles.

The Commission Internationale de l'Eclairage has also published a document entitled "Colorimétrie, Recommandations Officielles de la C.I.E. [*Colorimetry and Official Recommendations of the CIE*]" (May 1970) which describes a theory in which the colorimetric coordinates for light of each wavelength of the visible spectrum are defined so that they can be represented on a diagram having orthogonal axes x and y, called the C.I.E. trichromaticity plot 1931. This trichromaticity plot shows the locus representative of light of each wavelength (expressed in nanometers) of the visible spectrum. This locus is called the "spectrum locus" and light having coordinates lying on this spectrum locus is said to have 100% excitation purity for the appropriate wavelength. The spectrum locus is closed by a line called the purple boundary which connects the points of the spectrum locus, the coordinates of which correspond to wavelengths of 380 nm (violet) and 780 nm (red). The area lying between the spectrum locus and the purple boundary is that available for the trichromaticity coordinates of any visible light. The coordinates of the light emitted by illuminant C, for example, correspond to x=0.3101 and y=0.3162. This point C is regarded as representing white light, and consequently has an excitation purity equal to zero for any wavelength. Lines may be drawn from point C to the spectrum locus at any desired wavelength and any point lying on these lines may be defined not only by its x and y coordinates, but also as a function of the wavelength corresponding to the line on which it lies and of its distance from point C relative to the total length of the wavelength line. Consequently, the colour of the light transmitted by a coloured glass sheet may be described by its dominant wavelength ($\lambda D$) and its excitation purity (P) expressed as a percentage.

The C.I.E. coordinates of light transmitted by a coloured glass sheet will depend not only on the composition of the glass but also on its thickness. In the present description, as in the claims, all the values of the excitation purity P and the dominant wavelength $\lambda_D$ of the transmitted light are calculated from the spectral specific internal transmissions ($SIT_\lambda$) of a glass sheet 5 mm in thickness with illuminant C from a solid viewing angle of 2°. The spectral specific internal transmission of a glass sheet is governed solely by the absorption of the glass and can be expressed by the Beer-Lambert law:

$$SIT_\lambda = e^{-E \cdot A_\lambda}$$

where $A_\lambda$ is the absorption coefficient (in $cm^{-1}$) of the glass at the wavelength in question and E the thickness (in cm) of the glass. In a first approximation, $SIT_\lambda$ may also be represented by the formula:

$$(I_3 + R_2)/(I_1 - R_1)$$

where $I_1$ is the intensity of the incident visible light on a first face of the glass sheet, $R_1$ is the intensity of the visible light reflected by this face, $I_3$ is the intensity of the visible light transmitted from the second face of the glass sheet and $R_2$ is the intensity of the visible light reflected by this second face towards the interior of the sheet.

The following are also used in the following description and the claims:

for illuminant A, the total light transmission (TLA) measured for a thickness of 4 mm (TLA4) from a solid viewing angle of 2°. This total transmission is the result of the integration between the 380 and 780 nm wavelengths of the expression: $\Sigma T_\lambda . E_\lambda . S_\lambda / \Sigma E_\lambda . S_\lambda$ in which $T_\lambda$ is the transmission at wavelength $\lambda$, $E_\lambda$ is the spectral distribution of illuminant A and $S_\lambda$ is the sensitivity of the normal human eye as a function of wavelength $\lambda$;

the total energy transmission (TE) measured for a thickness of 4 mm (TE4). This total transmission is the result of the integration between the 300 and 2500 nm wavelengths of the expression: $\Sigma T_\lambda . E_\lambda / \Sigma E_\lambda$. The energy distribution $E_\lambda$ is the spectral energy distribution of the sun at 30° above the horizon with an air mass equal to 2 and an inclination of the glazing of 60° relative to the horizontal. This distribution, called "Moon distribution", is defined in the standard ISO 9050;

the selectivity (SE) measured as the ratio of the total light transmission for illuminant A to the total energy transmission (TLA/TE);

the total transmission in the ultraviolet, measured for a thickness of 4 mm (TUV4). This total transmission is the result of the integration between 280 and 380 nm of the expression: $\Sigma\ T_\lambda.U_\lambda/\Sigma\ U_\lambda$ in which $U_\lambda$ is the spectral distribution of the ultraviolet radiation that has passed through the atmosphere, defined in the standard DIN 67507;

the $Fe^{2+}$/total Fe ratio, sometimes called the redox ratio, which represents the value of the ratio of weight of atoms of $Fe^{+2}$ to the total weight of iron atoms present in the glass and is obtained by the formula:

$$Fe^{2+}/\text{total Fe} = [24.4495 \times \log(92/\tau_{1050})]/t_{-Fe2O3}$$

where $\tau_{1050}$ represents the specific internal transmission of the 5 mm thick glass at the 1050 nm wavelength, $t_{-Fe2O3}$ represents the total iron content expressed in the form of oxide $Fe_2O_3$ and measured by X-ray fluorescence.

Coloured glass can be used in architectural applications and as glazing for railway carriages and motor vehicles. In architectural applications, glass sheets 4 to 6 mm in thickness are generally used, while in the automotive field thicknesses of 1 to 5 mm are normally employed, particularly for the production of monolithic glazing, and thicknesses of between 1 and 3 mm in the case of laminated glazing, especially for windscreens, two glass sheets of this thickness then being bonded together by means of an interlayer film, generally made of polyvinyl butyral (PVB).

SUMMARY OF THE INVENTION

One of the objects of the invention is to provide a soda-lime glass of low light transmission, preferably blue in colour, which enables the unpleasing discolouration of the objects located inside areas enclosed by this glass to be restricted.

The European patent application EP 0 101 36 20 A1 and the international application PCT/EP01/06861 describe highly selective glasses containing iron with a high redox ratio ($Fe^{2+}$/total iron), and also cobalt and/or chromium and/or vanadium respectively. However, to promote a high redox ratio may be detrimental to other optical properties such as total transmission in the ultraviolet which is responsible for the discolouration of objects located inside areas enclosed by such glasses.

The invention proposes glass compositions which have all the desired properties and in particular that of a filter for ultraviolet solar radiation.

The present invention provides a coloured soda-lime glass which comprises the principal glass-forming constituents and colouring agents comprising:

iron in a quantity which, expressed in weight of the oxide $Fe_2O_3$ in relation to the total weight of glass, is greater than or equal to 0.5, and less than or equal to 1.0% (quantity of total iron), ferrous iron in a quantity which, expressed in weight of atoms of $Fe^{2+}$ in relation to the total weight of iron atoms present in the glass, lies in the range of between 20 and 65% (ratio of $Fe^{2+}$/total Fe), cerium in a quantity which, expressed in weight of $CeO_2$ in relation to the total weight of glass, is greater than or equal to 0.1%, titanium in a quantity which, expressed in weight of $TiO_2$ in relation to the total weight of glass, is greater than or equal to 0% and less than 0.2%, and the glass has:

a light transmission, measured for illuminant A and calculated for a thickness of 4 mm (TLA4), which lies in the range of between 15 and 55%, a total transmission in the ultraviolet measured for a thickness of 4 mm (TUV4) of less than or equal to 30%, a dominant wavelength in transmission ($\lambda_D$) of less than or equal to 491 nm.

It has been found that such a glass allows commercially desirable considerations relating to both aesthetics and energy to be met. In the automotive sector in particular a coloured glass according to the invention can have a blue tint, with a wavelength in transmission of less than or equal to 491 nm, which is appreciated by motor vehicle manufacturers, a low light transmission and a low total transmission in the ultraviolet enabling the unpleasing discolouration of the objects located inside areas enclosed by this glass to be restricted.

The presence of cerium in a quantity which, expressed in weight of $CeO_2$ in relation to the total weight of glass is greater than or equal to 0.1%, combined with the composition criteria relating to iron, allows a glass to be produced with a wavelength in transmission, light transmission and total transmission in the ultraviolet that meet present criteria relating to aesthetics and energy, especially required by motor vehicle manufacturers.

Iron is present in the majority of glasses currently on the market, in particular in coloured glasses. The presence of $Fe^{3+}$ provides the glass with a light absorption of the visible light of short wavelength (410 and 440 nm) and a very high absorption band in the ultraviolet (absorption band centred at 380 nm), while the presence of $Fe^{2+}$ ions causes a high absorption in the infrared (absorption band centred at 1050 nm). The presence of $Fe^{3+}$ gives the glass a slight yellow coloration, generally regarded as not very pleasing, while ferrous, $Fe^{2+}$, ions give a pronounced blue-green coloration. A strong concentration of $Fe^{2+}$ in the glass therefore allows the energy transmission TE to be reduced and a pleasing coloration to be provided. However, the presence of iron in the bath of molten glass results in an absorption of infrared radiation which can hinder heat diffusion in the glass production furnace, and therefore make this production more difficult. Moreover, when the concentration of iron increases, the light transmission of the glass decreases.

The energy and optical properties of a glass, in particular its colour, its light transmission and its total transmission in the ultraviolet, result from a complex interaction between its components. The behaviour of components of the glass depends on their redox state and therefore on the presence of other components which can influence this redox state.

It has been found that the glass as defined in the claims enables aesthetic criteria (colour) and optical/energy criteria (light transmission and total transmission in the ultraviolet) to be responded to by easily controlling its composition, particularly in terms of iron and cerium.

Preferably, the quantity of total iron is less than or equal to 0.90%, and preferably less than or equal to 0.89%. This facilitates the transition of the production of clear glass to the production of coloured glass.

Preferably, the quantity of total iron is at least 0.7% or even at least 0.75%. This promotes not only the formation of a colour that is pleasing to the eye, but also the formation of a low light transmission as well as a low energy transmission.

Preferably, the glass according to the invention comprises ferrous iron in a quantity which, expressed in weight of atoms of $Fe^{2+}$ in relation to the total weight of iron atoms present in the glass, lies in the range of between 20 and 65%, preferably between 35 and 55%, and advantageously between 40 and 50%. Such a ratio enables a glass to be obtained that combines a good selectivity with a low transmission in the ultraviolet.

Preferably, the glass according to the invention comprises cerium in a quantity which, expressed in weight of $CeO_2$ in relation to the total weight of glass, is greater than 0.15%, preferably greater than 0.25%, in order to restrict as far as possible the unpleasing discoloration of objects located inside areas enclosed by the glass according to the invention under the effect of ultraviolet solar radiation. The glass according to the invention preferably comprises cerium in a quantity which, expressed in weight of $CeO_2$ in relation to the total weight of glass, is less than 1.0%, preferably less than or equal to 0.5%. In fact, cerium, when present in too large a quantity, can cause the dominant wavelength to shift towards green and yellow, which is contrary to the preferred tint.

The invention advantageously combines a high redox ratio with a quantity of cerium which enables the desired properties to be provided without the aesthetic aspect of the glass being impaired.

Preferably, the glass according to the invention comprises a quantity of titanium which, expressed in weight of $TiO_2$ in relation to the total weight of glass, is greater than or equal to 0% and less than 0.2%, and preferably less than 0.15%, or even less than 0.10%. In fact, a high content of $TiO_2$ poses the risk of imparting an unwanted yellow coloration. In some cases, $TiO_2$ will only be contained in the glass as a result of the presence of impurities, with no intentional addition.

To produce a glass with a colour which is commercially desirable as it is considered to be pleasing to the eye, the glass according to the invention can contain one or more of the following colouring agents in addition to those already mentioned.

cobalt

The presence of cobalt tends to give the glass an intense blue colour. Preferably, the glass according to the invention comprises cobalt in a quantity which, expressed in weight of Co in relation to the total weight of glass, is greater than 75 ppm, and even greater than 100 ppm. Preferably, the quantity of cobalt is less than or equal to 350 ppm, and advantageously less than or equal to 250 ppm. A quantity of cobalt that is too high can in fact impair the selectivity of the glass.

In a preferred form, the glass according to the invention comprises the principal glass-forming constituents and colouring agents, the colouring agents consisting essentially of Fe, Ce and Co according to at least one of the ranges mentioned above. Ti may possibly be added to this composition.

In another preferred form, the glass according to the invention comprises the principal glass-forming constituents and colouring agents, the colouring agents consisting of Fe, Ce and Co according to at least one of the ranges mentioned above. Ti may possibly be added to this composition.

chromium

The presence of $Cr^{III}$ tends to give the glass a light green coloration, whereas the presence of $Cr^{VI}$ produces a very intense absorption band of 365 nm and a yellow coloration of the glass. Preferably, the glass comprises chromium in a quantity which, expressed in weight of $Cr_2O_3$ in relation to the total weight of glass, is at least 5 parts per million (ppm). In some cases, the glass can comprise chromium in a quantity that is greater than or equal to 50 ppm, and even greater than or equal to 100 ppm. Preferably the quantity of chromium is less than 1000 ppm, and advantageously less than or equal to 500 ppm.

In a preferred form, the glass according to the invention comprises the principal glass-forming constituents and colouring agents, the colouring agents consisting essentially of Fe, Ce, Co and Cr according to at least one of the ranges mentioned above. Ti may possibly be added to this composition.

In another preferred form, the glass according to the invention comprises the principal glass-forming constituents and colouring agents, the colouring agents consisting of Fe, Ce, Co and Cr according to at least one of the ranges mentioned above. Ti may possibly be added to this composition.

vanadium

The presence of vanadium tends to give the glass a green tint. Preferably, the glass according to the invention comprises vanadium in a quantity which, expressed in weight of $V_2O_5$ in relation to the total weight of glass, is less than 1000 ppm, and advantageously less than 500 ppm. In some cases, $V_2O_5$ will only be contained in the glass as a result of the presence of impurities, with no intentional addition.

The light transmission TLA4 of the coloured glass according to the invention lies in the range of between 15 and 55%, preferably between 20 and 45%, and advantageously between 25 and 35%. This makes this glass well suited for use, for example, as glazing for motor vehicles, in particular for side glazing, rear-view windows, roof glazing or also opening roofs.

The total transmission in the ultraviolet (TUV4) of the coloured glass according to the invention is preferably less than or equal to 30%, but can be less than or equal to 25%, and advantageously less than or equal to 20%. Such values for TUV4 help to prevent the unpleasing discoloration of objects located in areas enclosed by such a glass and exposed to ultraviolet solar radiation.

It is desirable if the coloured glass according to the invention has an energy transmission TE4 of less than 45%, preferably less than 35%, and advantageously less than 25%. A low energy transmission helps limit the temperature increase in the internal area enclosed by the glass according to the invention, such as a building or motor vehicle, during exposure to the sun.

The glass according to the invention preferably has a selectivity greater than 1.0, preferably greater than 1.1. A high selectivity is advantageous both for applications in motor vehicles and in architectural applications, since it helps limit the temperature increase associated with solar radiation, and thus increase the thermal comfort of occupants of the vehicle or building while providing high natural illumination and visibility through the glazing.

With respect to the colour of the glass according to the invention, it is desirable if its dominant wavelength in transmission $\lambda_D$ is less than or equal to 489 nm. This corresponds to a glass whose colour in transmission is generally tinted blue, which is pleasing to the human eye and is highly appreciated commercially, in particular for glazing for motor vehicles. It is advantageous if the glass has a $\lambda_D$ of less than or equal to 487 nm.

The excitation purity in transmission of the glass according to the invention is preferably greater than 10%, and preferably greater than 15%. This corresponds to a pronounced tint, which is commercially desirable. In some cases, the excitation purity in transmission can be greater than or equal to 20%, and even greater than 25%.

In some cases, the glass according to the invention can comprise less than 200 parts per million (ppm), preferably less than 100 ppm, of nickel, expressed in weight of NiO in relation to the total weight of glass. The presence of nickel can impair the selectivity of the glass containing it, since it does not absorb light in the infrared range, which results in a significant energy transmission value. In addition, it gives the glass a yellow coloration. Moreover, the presence of nickel can cause difficulties in the production of glass (formation of sulphides, inclusions of nickel in the glass). In particular embodiments, the glass according to the invention is free of nickel as colouring agent.

Preferably, the glass according to the invention comprises less than 1500 parts per million, preferably less than 500 parts per million, of manganese expressed in weight of $MnO_2$ in relation to the total weight of glass. Manganese in the form of $MnO_2$ has an oxidising character which can modify the redox state of the iron and induce a green hue.

Preferably, the glass according to the invention comprises more than 2% by weight of magnesium oxide MgO in relation to the total weight of glass. The presence of magnesium benefits the fusion of the constituents during melting of the glass.

Advantageously, the glass according to the invention comprises less than 30 parts per million of selenium, preferably less than 20 parts per million by weight of Se in relation to the total weight of glass. The presence of selenium as colouring agent can promote a low light transmission, but if present in too large a quantity, it can give the glass an unwanted pink or red coloration.

According to a preferred form of the invention, the colouring agents are present in a quantity corresponding to the following proportions (expressed as a percentage of the total weight of glass in the form indicated):

| | |
|---|---|
| $Fe_2O_3$ | 0.5–1.0% |
| $CeO_2$ | 0.1–0.95% |
| Co | 130–160 ppm |
| $Cr_2O_3$ | 150–950 ppm |
| Se | 0–10 ppm |
| $TiO_2$ | 0–0.15% |
| $Fe^{2+}$/total Fe | 30–50% |

This glass preferably has the following optical properties:

| | |
|---|---|
| TLA4 | 15–55% |
| TE4 | <45% |
| TUV4 | ≦30% |
| $\lambda_D$ | ≦491 nm |
| P | >10% and ≦35% |

According to a particularly preferred form of the invention, the colouring agents are present in a quantity corresponding to the following proportions (expressed as a percentage of the total weight of glass in the form indicated):

| | |
|---|---|
| $Fe_2O_3$ | 0.7–0.9% |
| $CeO_2$ | 0.2–0.7% |
| Co | 135–150 ppm |
| $Cr_2O_3$ | 300–500 ppm |
| Se | 0–10 ppm |
| $TiO_2$ | 0–0.15% |
| $Fe^{2+}$/total Fe | 35–45% |

This glass preferably has the following optical properties:

| | |
|---|---|
| TLA4 | 25–40% |
| TE4 | 20–30% |
| TUV4 | 10–20% |
| $\lambda_D$ | 480–490 nm |
| P | 20–35% |

According to a preferred embodiment, the glass according to the invention comprises the principal glass-forming constituents and colouring agents, the colouring agents consisting essentially of Fe, Ce, Co, Cr and Se according to at least one of the ranges mentioned above. Ti may possibly be added to this composition.

In another preferred form, the glass according to the invention comprises the principal glass-forming constituents and colouring agents, the colouring agents consisting of Fe, Ce, Co, Cr and Se according to least one of the ranges mentioned above. Ti may possibly be added to this composition.

It is desirable if the glass according to the invention does not contain fluorinated compounds, or at least if these do not constitute more than 0.2% by weight of F in relation to the glass. These compounds in fact generate furnace discharges which are harmful to the environment and are, moreover, corrosive with respect to the refractory materials which line the inside of the production furnace.

The coloured glass according to the invention preferably forms a glazing for motor vehicles. It may, for example, be advantageously used for side glazing or rear-view windows of a vehicle or roof glazing or opening roofs.

The glass according to the invention may be coated with a layer. For example, this can be a layer of metal oxides, which reduce the temperature increase resulting from solar radiation and consequently the temperature increase inside the passenger compartment of a vehicle using such glass as glazing.

The glasses according to the invention can be manufactured by conventional processes. As batch materials, it is possible to use natural materials, recycled glass, slag or a combination of these materials. The colouring agents are not necessarily added in the form indicated, but this manner of giving the amounts of colouring agents added in equivalents in the forms indicated corresponds to standard practice. In practice, iron is added in the form of red iron oxide, cobalt is added in the form of hydrated sulphate, such as $CoSO_4.7H_2O$ or $CoSO_4.6H_2O$ and chromium is added in the form of dichromate such as $K_2Cr_2O_7$. Cerium is often introduced in oxide or carbonate form, and vanadium in the form of vanadium oxide or sodium vanadate. Selenium, when present, can be added in elemental form or in selenite form such as $Na_2SeO_3$ or $ZnSeO_3$.

Other elements are sometimes present as a result of impurities in the batch materials used to manufacture the glass according to the invention, whether these are natural materials, recycled glass or slag, which are increasingly used, but when these impurities do not give the glass properties outside the limits defined above, these glasses are regarded as complying with the present invention.

Detail Description

The present invention shall now be illustrated by the following examples:

EXAMPLES 1 to 143

Table I specifies by way of non-restrictive indication the base composition of the glass. It should be understood that a glass with the same optical and energy properties can be obtained with a base composition having amounts of oxides lying within the ranges of percentages by weight given at the beginning of the present description.

The glasses according to the examples comprise less than 100 parts per million (ppm) of NiO, less than 500 ppm of $MnO_2$ and, unless specified otherwise, less than 3 ppm of Se, less than 0.1% of $TiO_2$ and more than 2% of MgO.

TABLE I

| Analysis of the base glass | |
|---|---|
| $SiO_2$ | 71.5–71.9% |
| $Al_2O_3$ | 0.8% |
| CaO | 8.8% |
| MgO | 4.2% |
| $Na_2O$ | 14.1% |
| $K_2O$ | 0.1% |
| $SO_3$ | 0.05–0.45% |

The following table gives the concentrations of the components, the optical and energy properties of glasses according to the invention. The concentrations are determined by X-ray fluorescence of the glass and are converted to the indicated molecular state.

TABLE II

| Ex. | $Fe_2O_3$ (%) | $Fe^{2+}$/Fe tot (%) | $CeO_2$ (%) | Co (ppm) | $Cr_2O_3$ (%) | Se (ppm) | TLA4 (%) | TUV4 (%) | $\lambda_D$ (nm) | TE4 (%) | P (%) | SE |
|---|---|---|---|---|---|---|---|---|---|---|---|---|
| 1 | 0.875 | 32.73 | 0.29 | 150 | 351 | | 32.9 | 12.6 | 483.3 | 25.9 | 30.2 | 1.27 |
| 2 | 0.873 | 35.42 | 0.49 | 146 | 352 | | 33.0 | 11.8 | 483.4 | 24.9 | 30.2 | 1.32 |
| 3 | 0.893 | 41.52 | 0.10 | 152 | 352 | | 31.4 | 15.8 | 482.9 | 22.4 | 33.3 | 1.40 |
| 4 | 0.874 | 33.58 | 0.49 | 147 | 354 | | 32.8 | 11.2 | 483.5 | 25.5 | 29.8 | 1.29 |
| 5 | 0.871 | 33.28 | 0.39 | 145 | 355 | | 32.7 | 11.7 | 483.6 | 25.7 | 29.7 | 1.27 |
| 6 | 0.870 | 32.72 | 0.49 | 147 | 362 | | 32.7 | 11.1 | 483.6 | 25.8 | 29.6 | 1.27 |
| 7 | 0.848 | 24.12 | 0.97 | 142 | 359 | | 34.9 | 8.3 | 484.4 | 31.4 | 25.3 | 1.11 |
| 8 | 0.890 | 39.35 | 0.10 | 152 | 343 | | 31.7 | 16.0 | 482.8 | 23.1 | 33.0 | 1.37 |
| 9 | 0.867 | 35.19 | 0.48 | 146 | 352 | | 32.4 | 11.7 | 483.4 | 24.8 | 30.5 | 1.31 |
| 10 | 0.873 | 39.08 | 0.29 | 141 | 347 | | 32.4 | 13.8 | 483.3 | 23.5 | 31.3 | 1.38 |
| 11 | 0.850 | 25.65 | 0.97 | 138 | 363 | | 35.2 | 8.3 | 484.8 | 30.5 | 24.8 | 1.15 |
| 12 | 0.854 | 48.24 | 0.29 | 143 | 298 | | 29.6 | 14.3 | 482.4 | 20.4 | 35.8 | 1.45 |
| 13 | 0.854 | 46.99 | 0.285 | 148 | 308 | | 31.8 | 14.1 | 483.2 | 21.5 | 32.9 | 1.48 |
| 14 | 0.861 | 47.85 | 0.28 | 168 | 310 | | 29.7 | 14.4 | 482.5 | 20.6 | 35.4 | 1.44 |
| 15 | 0.898 | 49.89 | 0.30 | 148 | 354 | | 29.9 | 12.9 | 483.4 | 19.6 | 33.8 | 1.53 |
| 16 | 0.900 | 50.25 | 0.30 | 155 | 362 | | 29.3 | 13.4 | 482.5 | 19.3 | 36.1 | 1.52 |
| 17 | 0.882 | 45.50 | 0.30 | 149 | 322 | | 29.3 | 13.3 | 482.0 | 20.6 | 36.1 | 1.42 |
| 18 | 0.908 | 48.94 | 0.32 | 151 | 329 | | 28.6 | 13.1 | 482.5 | 19.1 | 36.5 | 1.50 |
| 19 | 0.906 | 49.05 | 0.30 | 160 | 333 | | 27.5 | 12.9 | 482.1 | 18.7 | 37.8 | 1.47 |
| 20 | 0.906 | 48.24 | 0.30 | 164 | 333 | | 28.5 | 12.7 | 482.5 | 19.3 | 36.3 | 1.48 |
| 21 | 0.864 | 30.81 | 0.68 | 145 | 313 | | 33.8 | 10.1 | 483.2 | 27.4 | 29.1 | 1.23 |
| 22 | 0.852 | 24.58 | 0.89 | 144 | 310 | | 34.9 | 8.6 | 483.6 | 31.3 | 26.6 | 1.15 |
| 23 | 0.850 | 23.97 | 0.97 | 141 | 316 | | 35.3 | 8.3 | 483.8 | 31.9 | 25.8 | 1.11 |
| 24 | 0.847 | 43.34 | 0.30 | 139 | 341 | | 30.5 | 14.2 | 482.3 | 22.2 | 34.9 | 1.37 |
| 25 | 0.800 | 44.00 | 0.30 | 140 | 400 | | 30.3 | 15.4 | 482.6 | 22.6 | 34.6 | 1.34 |
| 26 | 0.750 | 45.00 | 0.30 | 145 | 450 | | 29.5 | 16.8 | 482.7 | 22.7 | 35.3 | 1.30 |
| 27 | 0.700 | 45.00 | 0.50 | 145 | 500 | | 29.7 | 15.6 | 483.0 | 23.9 | 34.7 | 1.24 |
| 28 | 0.650 | 47.00 | 0.50 | 150 | 500 | | 28.9 | 16.9 | 482.5 | 23.5 | 36.5 | 1.22 |
| 29 | 0.700 | 45.00 | 0.40 | 155 | 400 | | 28.8 | 16.7 | 481.6 | 23.7 | 38.0 | 1.22 |
| 30 | 0.600 | 45.00 | 0.70 | 160 | 380 | | 29.5 | 15.4 | 480.8 | 26.4 | 39.4 | 1.12 |
| 31 | 0.550 | 45.00 | 0.70 | 155 | 550 | | 29.8 | 16.9 | 482.4 | 27.0 | 36.2 | 1.10 |
| 32 | 0.700 | 45.00 | 0.50 | 150 | 450 | | 29.3 | 15.6 | 482.3 | 23.8 | 36.3 | 1.23 |
| 33 | 0.500 | 50.00 | 0.90 | 155 | 590 | | 28.2 | 15.8 | 482.6 | 25.0 | 37.6 | 1.13 |
| 34 | 0.600 | 40.00 | 0.90 | 150 | 50 | | 35.7 | 12.2 | 478.0 | 32.4 | 38.7 | 1.10 |
| 35 | 0.850 | 40.00 | 0.90 | 140 | 50 | | 33.4 | 6.3 | 479.6 | 26.4 | 36.3 | 1.26 |
| 36 | 0.600 | 50.00 | 0.90 | 150 | 0 | | 32.1 | 12.1 | 478.0 | 26.1 | 43.0 | 1.23 |
| 37 | 0.850 | 40.00 | 0.90 | 140 | 0 | | 33.8 | 6.1 | 479.1 | 26.7 | 37.0 | 1.26 |
| 38 | 0.875 | 50.00 | 0.90 | 100 | 50 | | 36.1 | 5.4 | 481.7 | 21.8 | 32.1 | 1.66 |
| 39 | 0.850 | 55.00 | 0.90 | 70 | 50 | | 39.8 | 5.7 | 483.1 | 21.1 | 28.3 | 1.88 |
| 40 | 0.875 | 60.00 | 0.90 | 50 | 300 | | 39.0 | 5.5 | 487.7 | 17.0 | 23.2 | 2.29 |
| 41 | 0.850 | 50.00 | 0.90 | 30 | 0 | | 49.2 | 5.3 | 485.5 | 27.2 | 19.6 | 1.81 |
| 42 | 0.847 | 40.00 | 0.30 | 139 | 340 | | 31.8 | 14.2 | 482.3 | 24.4 | 33.7 | 1.30 |
| 43 | 0.850 | 44.00 | 0.30 | 140 | 500 | | 28.8 | 14.5 | 483.9 | 20.8 | 33.2 | 1.39 |
| 44 | 0.850 | 45.00 | 0.30 | 150 | 200 | | 29.9 | 13.8 | 483.9 | 21.5 | 33.2 | 1.39 |
| 45 | 0.850 | 45.00 | 0.30 | 170 | 100 | | 28.9 | 13.6 | 479.3 | 21.5 | 44.3 | 1.34 |
| 46 | 0.850 | 40.00 | 0.30 | 190 | 50 | | 29.5 | 13.5 | 478.3 | 24.5 | 46.9 | 1.20 |
| 47 | 0.850 | 45.00 | 0.30 | 200 | 0 | | 27.0 | 13.4 | 478.0 | 21.2 | 51.2 | 1.28 |
| 48 | 0.850 | 45.00 | 0.30 | 250 | 380 | | 19.6 | 14.2 | 480.1 | 17.5 | 54.9 | 1.12 |
| 49 | 0.600 | 25.00 | 0.95 | 350 | 20 | | 24.9 | 11.4 | 475.4 | 36.8 | 69.9 | 0.68 |
| 50 | 0.875 | 45.00 | 0.90 | 76 | 600 | | 32.4 | 6.9 | 489.8 | 21.3 | 19.8 | 1.52 |
| 51 | 0.850 | 50.00 | 0.11 | 105 | 600 | | 29.0 | 17.0 | 486.2 | 17.1 | 28.4 | 1.69 |
| 52 | 0.850 | 50.00 | 0.90 | 120 | 500 | | 27.8 | 7.3 | 485.1 | 17.9 | 30.3 | 1.55 |
| 53 | 0.700 | 55.00 | 0.90 | 160 | 0 | | 28.6 | 9.7 | 478.6 | 20.3 | 46.2 | 1.41 |
| 54 | 0.850 | 30.00 | 0.90 | 165 | 500 | | 31.6 | 7.2 | 483.5 | 29.7 | 31.1 | 1.07 |
| 55 | 0.850 | 45.00 | 0.90 | 180 | 380 | | 25.3 | 7.0 | 481.9 | 20.1 | 40.8 | 1.26 |
| 56 | 1.000 | 40.00 | 0.30 | 139 | 340 | | 29.3 | 10.6 | 482.9 | 20.4 | 33.4 | 1.44 |

TABLE II-continued

| Ex. | Fe$_2$O$_3$ (%) | Fe$^{2+}$/Fe tot (%) | CeO$_2$ (%) | Co (ppm) | Cr$_2$O$_3$ (%) | Se (ppm) | TLA4 (%) | TUV4 (%) | $\lambda_D$ (nm) | TE4 (%) | P (%) | SE |
|---|---|---|---|---|---|---|---|---|---|---|---|---|
| 57 | 0.950 | 44.00 | 0.30 | 140 | 500 | | 27.2 | 12.1 | 484.3 | 18.1 | 39.1 | 1.50 |
| 58 | 0.970 | 45.00 | 0.30 | 150 | 200 | | 28.0 | 11.0 | 481.1 | 18.4 | 39.1 | 1.52 |
| 59 | 1.000 | 45.00 | 0.30 | 170 | 100 | | 17.6 | 10.1 | 479.9 | 17.6 | 44.0 | 1.51 |
| 60 | 1.000 | 40.00 | 0.30 | 190 | 50 | | 27.1 | 10.0 | 479.0 | 20.5 | 46.6 | 1.32 |
| 61 | 0.970 | 45.00 | 0.30 | 200 | 0 | | 25.1 | 10.6 | 478.5 | 18.0 | 50.9 | 1.39 |
| 62 | 0.850 | 45.00 | 0.10 | 160 | 380 | | 27.8 | 16.6 | 481.9 | 16.6 | 39.2 | 1.39 |
| 63 | 0.850 | 45.00 | 0.10 | 140 | 550 | | 28.2 | 17.0 | 484.2 | 20.0 | 33.4 | 1.44 |
| 64 | 0.850 | 45.00 | 0.95 | 140 | 700 | | 26.3 | 7.1 | 486.5 | 19.5 | 29.5 | 1.35 |
| 65 | 0.900 | 40.00 | 0.95 | 140 | 800 | | 26.7 | 6.1 | 488.2 | 20.9 | 26.5 | 1.28 |
| 66 | 0.875 | 45.00 | 0.90 | 150 | 950 | | 23.1 | 7.7 | 488.8 | 23.1 | 17.0 | 1.35 |
| 67 | 0.900 | 40.00 | 0.50 | 237 | 600 | | 20.0 | 11.1 | 482.1 | 18.7 | 47.2 | 1.07 |
| 68 | 0.700 | 35.00 | 0.90 | 5 | 30 | | 50.0 | 9.7 | 485.3 | 37.8 | 10.7 | 1.32 |
| 69 | 0.700 | 30.00 | 0.20 | 34 | 30 | | 50.0 | 18.1 | 481.1 | 39.7 | 15.8 | 1.26 |
| 70 | 0.510 | 55.00 | 0.10 | 165 | 500 | | 28.0 | 24.9 | 481.6 | 21.6 | 42.7 | 1.29 |
| 71 | 0.850 | 45.00 | 0.90 | 280 | 380 | | 16.4 | 7.0 | 479.9 | 17.1 | 58.9 | 0.96 |
| 72 | 0.970 | 45.00 | 0.90 | 200 | 600 | | 19.9 | 4.7 | 483.6 | 15.1 | 41.3 | 1.32 |
| 73 | 0.990 | 45.00 | 0.90 | 220 | 600 | | 17.8 | 4.2 | 483.1 | 13.9 | 44.9 | 1.27 |
| 74 | 0.850 | 30.00 | 0.20 | 48 | 455 | | 42.9 | 15.6 | 490.9 | 32.8 | 12.9 | 1.31 |
| 75 | 0.850 | 20.00 | 0.90 | 200 | 380 | | 33.4 | 6.94 | 481.0 | 35.8 | 35.4 | 0.93 |
| 76 | 0.850 | 25.00 | 0.20 | 180 | 380 | | 33.8 | 15.4 | 481.1 | 32.6 | 35.4 | 1.04 |
| 77 | 0.850 | 20.00 | 0.30 | 180 | 380 | | 35.6 | 14.1 | 481.1 | 35.9 | 33.3 | 0.99 |
| 78 | 0.850 | 50.00 | 0.20 | 140 | 300 | | 28.1 | 15.3 | 481.9 | 17.9 | 38.2 | 1.57 |
| 79 | 0.850 | 50.00 | 0.40 | 150 | 380 | | 26.5 | 15.3 | 482.4 | 17.3 | 38.5 | 1.53 |
| 80 | 0.820 | 30.00 | 0.40 | 100 | 380 | | 39.2 | 13.7 | 482.4 | 32.7 | 38.5 | 1.20 |
| 81 | 0.800 | 33.00 | 0.40 | 80 | 200 | | 41.6 | 13.8 | 482.4 | 32.9 | 38.5 | 1.27 |
| 82 | 0.750 | 35.00 | 0.40 | 50 | 180 | | 44.4 | 14.9 | 482.4 | 33.9 | 38.5 | 1.31 |
| 83 | 0.850 | 32.00 | 0.20 | 40 | 150 | | 45.3 | 14.9 | 482.4 | 33.5 | 38.5 | 1.35 |
| 84 | 0.650 | 40.00 | 0.20 | 20 | 50 | | 48.0 | 19.4 | 482.4 | 34.7 | 38.5 | 1.38 |
| 85 | 0.800 | 32.00 | 0.40 | 15 | 20 | | 49.2 | 13.4 | 482.4 | 36.5 | 38.5 | 1.35 |
| 86 | 0.847 | 43.34 | 0.30 | 139 | 341 | | 30.5 | 14.2 | 482.3 | 22.2 | 34.9 | 1.37 |
| 87 | 0.850 | 44.00 | 0.30 | 140 | 340 | 10 | 27.8 | 14.1 | 482.8 | 20.3 | 28.3 | 1.37 |
| 88 | 0.900 | 45.00 | 0.30 | 145 | 450 | 30 | 20.3 | 13.2 | 487.6 | 14.8 | 14.4 | 1.38 |
| 89 | 0.850 | 45.00 | 0.50 | 175 | 500 | 30 | 15.3 | 12.4 | 485.0 | 14.0 | 18.9 | 1.09 |
| 90 | 1.000 | 50.00 | 0.50 | 190 | 500 | | 15.0 | 9.0 | 482.4 | 9.8 | 44.1 | 1.53 |
| 91 | 1.000 | 50.00 | 0.40 | 156 | 400 | 30 | 15.1 | 9.7 | 485.8 | 8.5 | 18.4 | 1.77 |
| 92 | 0.850 | 45.00 | 0.70 | 145 | 300 | 20 | 24.2 | 9.3 | 483.2 | 18.6 | 22.2 | 1.30 |
| 93 | 0.900 | 45.00 | 0.50 | 130 | 0 | 20 | 28.6 | 9.7 | 479.6 | 19.8 | 23.8 | 1.44 |
| 94 | 0.890 | 40.00 | 0.70 | 100 | 0 | 30 | 33.6 | 7.3 | 483.3 | 24.1 | 8.8 | 1.39 |
| 95 | 0.880 | 50.00 | 0.90 | 120 | 35 | 25 | 27.0 | 5.4 | 481.6 | 17.2 | 18.7 | 1.57 |
| 96 | 0.900 | 40.00 | 0.90 | 130 | 0 | 28 | 28.4 | 4.9 | 479.9 | 22.4 | 15.4 | 1.27 |
| 97 | 0.847 | 43.34 | 0.30 | 139 | 341 | | 30.5 | 14.2 | 482.3 | 22.2 | 34.9 | 1.37 |
| 98 | 0.850 | 44.00 | 0.30 | 140 | 340 | 4 | 29.1 | 14.1 | 482.4 | 21.1 | 32.5 | 1.38 |
| 99 | 0.900 | 45.00 | 0.20 | 145 | 450 | 7 | 25.6 | 14.4 | 483.8 | 17.7 | 30.5 | 1.44 |
| 100 | 0.850 | 45.00 | 0.50 | 163 | 500 | 15 | 20.8 | 12.3 | 484.0 | 16.8 | 27.0 | 1.24 |
| 101 | 1.000 | 50.00 | 0.50 | 180 | 400 | 3 | 16.9 | 8.7 | 482.1 | 10.6 | 41.4 | 1.59 |
| 102 | 1.000 | 50.00 | 0.40 | 156 | 400 | 6 | 20.5 | 9.7 | 483.2 | 11.7 | 35.0 | 1.75 |
| 103 | 0.850 | 45.00 | 0.70 | 145 | 300 | 14 | 25.6 | 9.3 | 482.7 | 19.4 | 26.4 | 1.32 |
| 104 | 0.900 | 45.00 | 0.50 | 130 | 0 | 13 | 30.2 | 9.7 | 479.6 | 20.7 | 28.7 | 1.46 |
| 105 | 0.890 | 40.00 | 0.90 | 100 | 0 | 15 | 36.8 | 4.9 | 481.7 | 26.2 | 18.7 | 1.40 |
| 106 | 0.880 | 50.00 | 0.80 | 100 | 550 | 11 | 29.7 | 7.6 | 489.8 | 17.2 | 18.7 | 1.72 |
| 107 | 0.900 | 40.00 | 0.30 | 130 | 500 | 15 | 27.9 | 13.2 | 486.9 | 20.7 | 19.5 | 1.35 |
| 108 | 0.900 | 40.00 | 0.30 | 130 | 450 | 15 | 28.3 | 13.1 | 486.1 | 21.0 | 20.1 | 1.35 |
| 109 | 0.900 | 40.00 | 0.30 | 130 | 400 | 15 | 28.7 | 13.0 | 485.3 | 21.3 | 20.7 | 1.35 |
| 110 | 0.900 | 42.00 | 0.30 | 130 | 350 | 15 | 28.3 | 12.9 | 484.4 | 20.2 | 22.0 | 1.40 |
| 111 | 0.950 | 45.00 | 0.40 | 130 | 500 | | 27.6 | 10.9 | 484.8 | 17.9 | 31.4 | 1.55 |
| 112 | 0.850 | 44.00 | 0.40 | 110 | 500 | | 31.4 | 13.3 | 485.3 | 21.7 | 27.6 | 1.45 |
| 113 | 0.850 | 50.00 | 0.40 | 120 | 450 | | 28.6 | 13.2 | 484.2 | 17.8 | 32.2 | 1.60 |
| 114 | 0.800 | 45.00 | 0.30 | 100 | 500 | | 30.8 | 15.7 | 485.3 | 19.3 | 28.3 | 1.59 |
| 115 | 0.825 | 40.00 | 0.80 | 100 | 550 | | 33.6 | 9.1 | 487.1 | 25.4 | 22.9 | 1.32 |
| 116 | 0.800 | 45.00 | 1.00 | 160 | 300 | | 28.5 | 6.8 | 481.6 | 22.6 | 38.1 | 1.26 |
| 117 | 0.850 | 45.00 | 1.00 | 140 | 380 | | 28.8 | 5.8 | 483.2 | 21.4 | 33.4 | 1.35 |
| 118 | 0.850 | 45.00 | 1.00 | 125 | 370 | | 30.2 | 5.8 | 483.7 | 21.9 | 30.8 | 1.38 |
| 119 | 0.850 | 45.00 | 0.95 | 115 | 400 | | 30.9 | 6.4 | 484.4 | 22.0 | 28.8 | 1.41 |
| 120 | 0.855 | 25.00 | 0.95 | 110 | 450 | | 38.7 | 6.4 | 486.1 | 34.8 | 20.1 | 1.11 |
| 121 | 0.875 | 45.00 | 0.50 | 115 | 450 | | 30.5 | 11.4 | 484.7 | 20.6 | 29.2 | 1.48 |
| 122 | 0.950 | 50.00 | 0.40 | 105 | 490 | | 28.0 | 10.9 | 485.7 | 15.4 | 28.9 | 1.82 |
| 123 | 0.850 | 59.00 | 0.40 | 120 | 500 | | 24.6 | 13.3 | 484.5 | 11.6 | 34.8 | 2.12 |
| 124 | 0.700 | 64.00 | 0.40 | 80 | 400 | | 29.5 | 16.6 | 484.4 | 14.1 | 30.9 | 2.09 |
| 125 | 0.850 | 65.00 | 0.50 | 75 | 400 | | 27.0 | 11.9 | 485.4 | 9.7 | 30.0 | 2.78 |
| 126 | 0.850 | 60.00 | 0.40 | 80 | 380 | | 28.8 | 13.1 | 485.0 | 12.9 | 29.6 | 2.24 |
| 127 | 0.850 | 42.00 | 0.30 | 120 | 500 | | 31.4 | 14.5 | 484.8 | 22.7 | 28.9 | 1.39 |
| 128 | 0.850 | 43.00 | 0.30 | 130 | 600 | | 29.3 | 14.7 | 485.4 | 21.1 | 29.8 | 1.39 |
| 129 | 0.855 | 40.00 | 0.30 | 140 | 650 | | 29.1 | 14.7 | 485.6 | 22.4 | 29.9 | 1.30 |
| 130 | 0.825 | 45.00 | 0.30 | 115 | 500 | | 31.1 | 15.1 | 484.8 | 21.5 | 29.1 | 1.44 |
| 131 | 0.800 | 45.00 | 0.30 | 105 | 490 | | 32.4 | 15.6 | 485.1 | 22.5 | 27.5 | 1.44 |

TABLE II-continued

| Ex. | Fe$_2$O$_3$ (%) | Fe$^{2+}$/Fe tot (%) | CeO$_2$ (%) | Co (ppm) | Cr$_2$O$_3$ (%) | Se (ppm) | TLA4 (%) | TUV4 (%) | λ$_D$ (nm) | TE4 (%) | P (%) | SE |
|---|---|---|---|---|---|---|---|---|---|---|---|---|
| 132 | 0.850 | 45.00 | 1.00 | 100 | 0 | | 35.4 | 4.9 | 480.4 | 35.4 | 31.2 | 1.43 |
| 133 | 0.830 | 45.00 | 1.35 | 120 | 300 | | 31.3 | 1.9 | 483.4 | 23.3 | 30.0 | 1.34 |
| 134 | 0.810 | 47.00 | 0.10 | 105 | 460 | | 31.9 | 17.7 | 484.5 | 21.0 | 29.1 | 1.52 |
| 135 | 0.828 | 41.92 | 0.29 | 148 | 379 | | 31.8 | 15.3 | 483.0 | 23.1 | 32.8 | 1.38 |
| 136 | 0.800 | 40.00 | 0.90 | 105 | 100 | | 37.0 | 7.5 | 480.9 | 28.5 | 29.3 | 1.30 |
| 137 | 0.850 | 45.00 | 0.30 | 185 | 850 | | 21.7 | 15.2 | 485.4 | 16.7 | 37.1 | 1.29 |
| 138 | 0.850 | 46.00 | 0.30 | 180 | 800 | | 22.1 | 15.1 | 485.1 | 16.5 | 37.2 | 1.34 |
| 139 | 0.850 | 45.00 | 0.80 | 175 | 750 | | 22.9 | 9.0 | 485.3 | 18.0 | 35.4 | 1.27 |
| 140 | 0.875 | 47.00 | 0.10 | 175 | 750 | | 22.3 | 16.9 | 484.8 | 15.5 | 37.8 | 1.44 |
| 141 | 0.845 | 35.00 | 0.80 | 200 | 700 | | 25.1 | 9.0 | 484.0 | 24.2 | 36.9 | 1.04 |
| 142 | 0.856 | 40.00 | 0.30 | 187 | 750 | | 24.0 | 12.5 | 484.7 | 20.5 | 36.4 | 1.16 |
| 143 | 0.845 | 35.00 | 0.80 | 115 | 200 | | 36.6 | 7.9 | 481.9 | 29.7 | 28.2 | 1.23 |

The invention claimed is:

1. Coloured soda-lime glass which comprises principal glass-forming constituents and colouring agents:
   total iron in a quantity which, expressed in weight of the oxide Fe$_2$O$_3$ in relation to the total weight of glass, is greater than or equal to 0.5% and less than or equal to 0.848%;
   ferrous iron in a quantity which, expressed in weight of atoms of Fe$^{2+}$ in relation to total weight of iron atoms present in the glass (ratio of Fe$^{2+}$/total Fe), lies in the range of between 20% and 65%;
   cerium in a quantity which, expressed in weight of CeO$_2$ in relation to the total weight of glass, is greater than or equal to 0.1%;
   titanium in a quantity which, expressed in weight of TiO$_2$ in relation to the total weight of glass, is greater than or equal to 0% and less than 0.2%;
   the coloured soda-lime glass being free of selenium, and the glass has:
   a light transmission, measured for illuminant A and calculated for a thickness of 4 mm (TLA4), which lies in the range of between 15% and 55%;
   a total transmission in the ultraviolet measured for a thickness of 4 mm (TUV4) of less than or equal to 30%; and
   a dominant wavelength in transmission (λ$_D$) of less than or equal to 491 nm.

2. Coloured soda-lime glass according to claim 1, characterised by at least one of the following (A) through (I):
   (A) the quantity of total iron is further defined as being:
      (i) less than 0.848%
      (ii) at least 0.70%
      (iii) at least 0.75%;
      (iv) (i) and (ii); or
      (v) (i) and (iii);
   (B) the quantity of cerium is further defined as being:
      (i) greater than 0.10%;
      (ii) greater than 0.15%;
      (iii) less than or equal to 0.50%; or
      (iv) (ii) and (iii);
   (C) the quantity of titanium is further defined as being:
      (i) less than 0.15%; or
      (ii) less than 0.10%;
   (D) cobalt is present as a colouring agent in a quantity which, expressed in weight of Co in relation to the total weight of glass, is:
      (i) greater than 75 ppm;
      (ii) greater than 100 ppm;
      (iii) less than or equal to 350 ppm;
      (iv) less than or equal to 250 ppm;
      (v) (i) and (iv); or
      (vi) (ii) and (iii);
   (E) chromium is present as a colouring agent in a quantity which, expressed in weight of Cr$_2$O$_3$ in relation to the total weight of glass, is:
      (i) at least 5 ppm;
      (ii) at least 50 ppm;
      (iii) at least 100 ppm;
      (iv) less than 1000 ppm;
      (v) less than 500 ppm;
      (vi) less than or equal to 500 ppm; or
      (vii) (iii) and (v);
   (F) the quantity of Fe$^{2+}$ is further defined being:
      (i) within the range of between 35% and 55%; or
      (ii) within the range of between 40% and 50%;
   (G) TLA4 is further defined as being:
      (i) within the range of between 20% and 45%; or
      (ii) within the range of between 25% and 35%;
   (H) TUV4 is further defined as being:
      (i) less than or equal to 25%; or
      (ii) less than or equal to 20%;
   (I) λD is further defined as being:
      (i) less than or equal to 489 nm, or
      (ii) less than or equal to 487 nm.

3. Coloured soda-lime glass according to claim 2, further characterised by at least two of the aforementioned features (A) through (I).

4. Coloured soda-lime glass according to claim 2, further characterised by at least three of the aforementioned features (A) through (I).

5. Coloured soda-lime glass according to claim 2, further characterised by at least four of the aforementioned features (A) through (I).

6. Coloured soda-lime glass according to claim 2, further characterised by all of the aforementioned features (A) through (I).

7. Coloured soda-lime glass according to claim 2, characterised by at least one of the following (J) through (M):
   (J) vanadium is present as a colouring agent in a quantity which, expressed in weight of V$_2$O$_5$ in relation to the total weight of glass, is:
      (i) less than 1000 ppm; or
      (ii) less than 500 ppm;
   (K) the glass has an energy transmission measured according to the Moon distribution and calculated for a thickness of 4 mm (TE4) of:
      (i) less than 45%;
      (ii) less than 35%; or
      (iii) less than 25%;

(L) the glass has a selectivity (SE4) which is:
  (i) greaterthan 1.0;or
  (ii) greater than 1.1;
(M) the glass has an excitation purity in transmission which is:
  (i) greater then 10% or
  (ii) greater than 15%.

8. Coloured soda-lime glass according to claim 7, further characterised by at least two of the aforementioned features (J) through (M).

9. Coloured soda-lime glass according to claim 7, further characterised by at least three of the aforementioned features (J) through (M).

10. Coloured soda-lime glass according to claim 7, further characterised by all of the aforementioned features (J) through (M).

11. Coloured soda-lime glass according to claim 2, further characterised in that the colouring agents consist essentially of iron, cerium, titanium and cobalt.

12. Coloured soda-lime glass according to claim 2, further characterised in that the colouring agents consist of iron, cerium, titanium and cobalt.

13. Coloured soda-lime glass according to claim 2, further characterised in that the colouring agents consist essentially of iron, cerium, titanium, cobalt and chromium.

14. Coloured soda-lime glass according to claim 2, further characterised in that the colouring agents consist of iron, cerium, titanium, cobalt and chromium.

15. Coloured soda-lime glass according to claim 1, characterised by at least one of the following (J) through (M):
(J) vanadium is present as a colouring agent in a quantity which, expressed in weight of V2O5 in relation to the total weight of glass, is:
  (i) less than 1000 ppm; or
  (ii) less than 500 ppm;
(K) the glass has an energy transmission measured according to the Moon distribution and calculated for a thickness of 4 mm (TB4) of:
  (i) less than 45%;
  (ii) less than 35%; or
  (iii) less than 25%;
(L) the glass has a selectivity (SE4) which is:
  (i) greater than 1.0;or
  (ii) greater than 1.1;
(M) the glass has an excitation purity in transmission which is:
  (i) greater then 10% or
  (ii) greater than 15%.

16. Coloured soda-lime glass according to claim 15, further characterised by at least two of the aforementioned features (J) through (M).

17. Coloured soda-lime glass according to claim 15, further characterised by at least three of the aforementioned features (J) through (M).

18. Coloured soda-lime glass according to claim 15, further characterised by all of the aforementioned features (J) through (M).

19. Coloured soda-lime glass according to claim 1, characterised in that it is covered by a layer.

* * * * *